United States Patent [19]

Pack, Jr.

[11] Patent Number: 4,895,389

[45] Date of Patent: Jan. 23, 1990

[54] RUPTURABLE COVER FOR A VEHICLE AIR BAG COMPARTMENT

[75] Inventor: Wesley D. Pack, Jr., Pontiac, Mich.

[73] Assignee: E. I. DuPont de Nemours and Company, Wilmington, Del.

[21] Appl. No.: 238,697

[22] Filed: Aug. 31, 1988

[51] Int. Cl.⁴ .............................................. B60R 21/08
[52] U.S. Cl. ..................................... 280/732; 280/743
[58] Field of Search ............... 280/728, 729, 730, 731, 280/732, 743

[56] References Cited

U.S. PATENT DOCUMENTS

| | | | |
|---|---|---|---|
| 3,539,200 | 11/1970 | Chute | 280/731 |
| 3,622,176 | 11/1971 | Byer | 280/732 |
| 3,632,135 | 1/1972 | Chute et al. | 280/731 |
| 3,640,546 | 2/1972 | Brawn | 280/732 |
| 3,643,971 | 2/1972 | Kushnick | 280/732 |
| 3,708,179 | 1/1973 | Hulten | 280/732 |
| 3,756,617 | 9/1973 | Brawn | 280/732 |
| 3,768,824 | 10/1973 | Kloppe et al. | 280/731 |
| 3,778,085 | 12/1973 | Lipkin | 280/734 |
| 3,794,349 | 2/1974 | Fuller | 280/732 |
| 3,819,205 | 6/1974 | Dunford et al. | 280/731 |
| 3,904,222 | 9/1975 | Bursott et al. | 280/731 |
| 3,944,250 | 3/1976 | Wulf et al. | 280/732 |
| 3,966,227 | 6/1976 | Cameron | 280/752 |
| 4,097,064 | 6/1978 | Ikawa et al. | 280/732 |
| 4,120,516 | 10/1978 | Takamatsu et al. | 280/728 |
| 4,148,503 | 4/1979 | Shiratori et al. | 280/731 |
| 4,325,568 | 4/1982 | Clark et al. | 280/731 |
| 4,327,937 | 5/1982 | Scholz et al. | 280/732 |
| 4,332,398 | 6/1982 | Smith | 280/732 |
| 4,334,699 | 6/1982 | Patzelt et al. | 280/731 |
| 4,400,010 | 8/1983 | Stütz et al. | 280/732 |

FOREIGN PATENT DOCUMENTS

| | | | |
|---|---|---|---|
| 3116538 | 11/1982 | Fed. Rep. of Germany | 280/732 |
| 3315535 | 3/1984 | Fed. Rep. of Germany | |
| 3544704 | 10/1987 | Fed. Rep. of Germany | |
| 234764 | 10/1987 | Japan | 280/730 |

Primary Examiner—Kenneth R. Rice
Attorney, Agent, or Firm—James T. Corle

[57] ABSTRACT

A rupturable cover for a vehicle air bag compartment which includes two door sections connected by a rupturable membrane. Each door section includes a generally S-shaped hinge which allows the sections to pivot outwardly from each other when the rupturable membrane is ruptured to allow the exodus of the air bag. The cover may be mounted on an air bag module or on the dashboard of the vehicle by screws or heat staking.

9 Claims, 2 Drawing Sheets

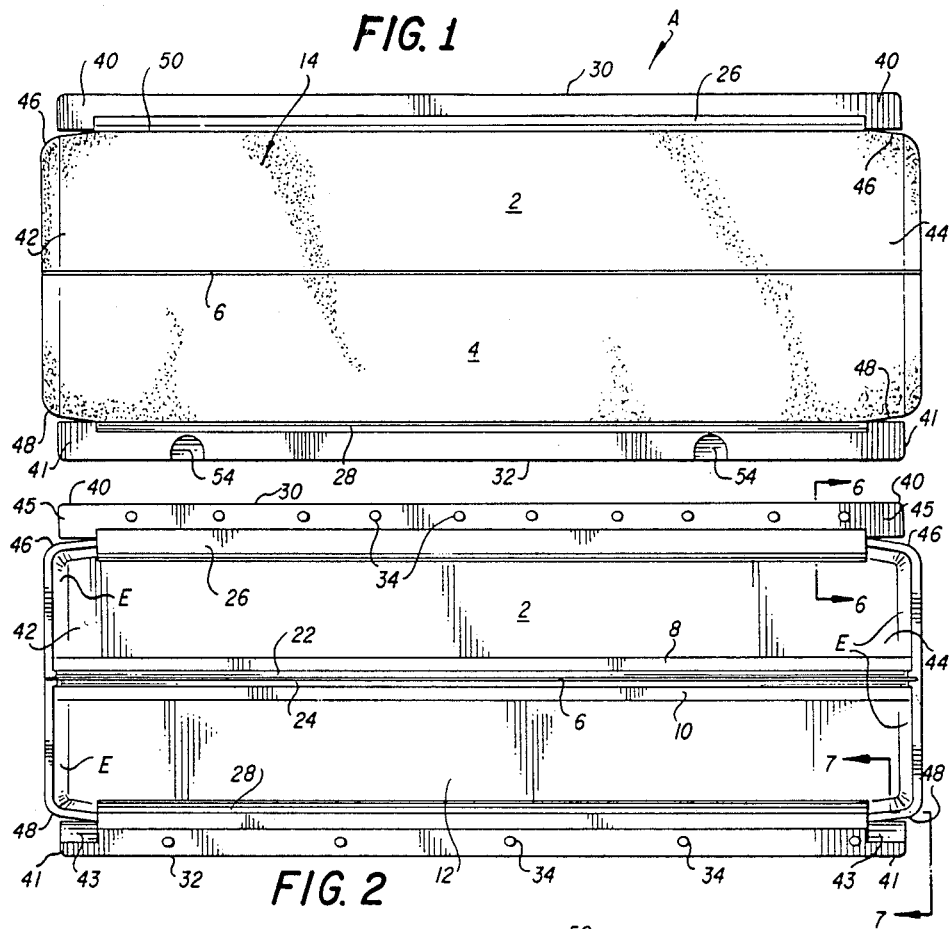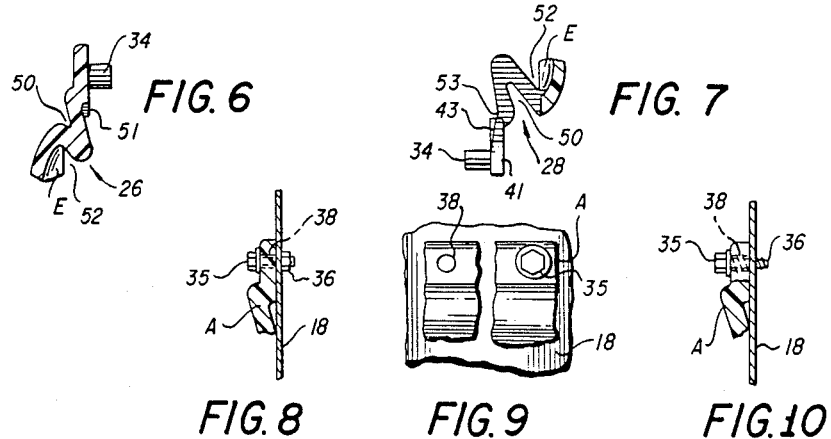

4,895,389

RUPTURABLE COVER FOR A VEHICLE AIR BAG COMPARTMENT

BACKGROUND AND FIELD OF THE INVENTION

The present invention is directed to a rupturable cover for a vehicle air bag system.

The prior art is replete with many air bag deployment devices. Examples of such devices are disclosed in U.S. Pat. Nos. 3,539,200; 3,622,176; 3,632,135; 3,640,546; 3,643,971; 3,708,179; 3,756,617; 3,768,824; 3,778,085; 3,794,349; 3,819,205; 3,904,222; 3,944,250; 3,966,227; 4,097,064; 4,120,516; 4,148,503; and German DE 3,315,535 and DE 3,544,704.

Many of the devices are relatively complex structures. They are expensive to manufacture and do not always function reliably under various operational and climatic conditions. Some of the systems which rely on separation of a cover to permit the air bag to deploy, fail to separate along predesigned paths.

There is a need for a rupturable cover for a vehicle air bag compartment which is of light-weight and of relatively simple construction, cost effective to manufacture, operates effectively over a wide range of temperatures without fracturing, and in which the doors open along a designed path to assure proper deployment of the air bag.

OBJECTS AND SUMMARY OF THE INVENTION

The principal object of the present invention is to provide a rupturable cover for a vehicle air bag system which is light-weight, operates effectively over a wide range of temperatures without fracturing or becoming inoperative, and is cost effective to manufacture.

Another object of the present invention is to provide a one-piece rupturable cover for a vehicle air bag compartment which can be manufactured in a one step molding operation and is easy to install in a motor vehicle.

The objects of this invention are achieved by providing a one-piece rupturable cover designed to open under a predetermined set of conditions. The design incorporates a rupturable membrane which functions as a tear seam and "S-shaped" flexible hinges which are integral with the cover. In the deployment of the air bag the buildup of pressure forces the bag against the cover which causes the membrane to rupture and the parts of the cover to rotate about the S-shaped flexible hinges, permitting the parted cover to move out of the path of the air bag. When the cover opens, stress builds up in the hinge areas. The S-shape of the hinges minimizes the stress as the opening in the outermost section of the S closes and the inner section of the S opens. This dual hinging action combined with increased thickness in parts of the hinge area where the greatest stress occur minimizes the chance of hinge breakage.

BRIEF DESCRIPTION OF THE DRAWINGS

The above and other objects and advantages and novel features of the present invention will become apparent from the following detailed description of the preferred embodiment of the invention illustrated in the accompanying drawings, in which:

FIG. 1 is a top plan view of a rupturable cover in accordance with the present invention;

FIG. 2 is a bottom plan view of the rupturable cover of the present invention;

FIG. 6 is a cross-sectional view taken along line 6—6 of FIG. 2;

FIG. 7 is a cross-sectional view taken along line 7—7 of FIG. 2;

FIG. 8 is a partial cross-sectional view showing the mounting details;

FIG. 9 is another view of FIG. 8; and FIG. 10 is a partial cross-sectional view showing mounting details alternative to FIG. 8.

DETAILED DESCRIPTION OF THE INVENTION

The rupturable cover of this invention as illustrated in the following figures is adapted for attachment on the passenger side of a motor vehicle.

As shown in FIG. 1, the rupturable cover A includes two sections 2 and 4 which are connected to each other by an integrally molded rupturable seam or membrane 6. The cover A is generally rectangular in shape and is made from a thermoplastic polymeric material. Although sections 2 and 4 are connected about a horizontal line, it is well within the scope of this invention to include a rupturable cover for a vehicle air bag compartment in which sections 2 and 4 are connected about a vertical line. The tear pattern selected will depend on whether the cover is mounted on the passenger side of the vehicle or on the steering wheel. The pattern is not critical so long as, on opening, the bag is deployed uniformly.

Figure 3:
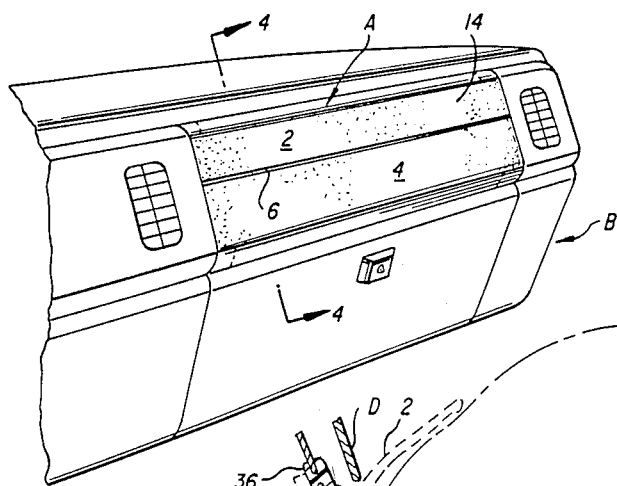
FIG. 3 is a perspective view showing the rupturable cover installed in a vehicle.
Figure 4:
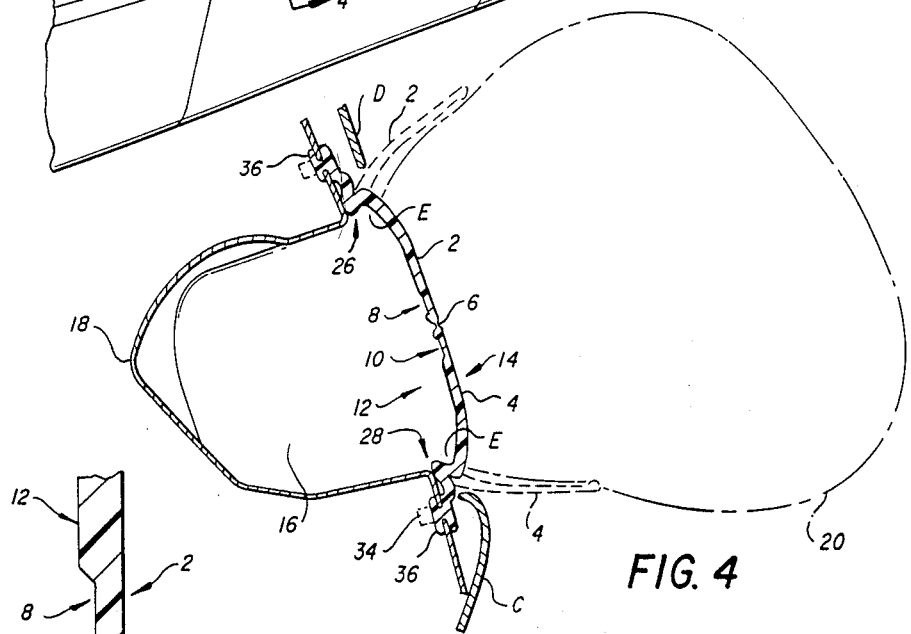
FIG. 4 is a cross-sectional view taken along line 4—4 of FIG. 3.
Figure 5:
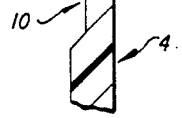
FIG. 5 is an enlarged partial cross-sectional view showing the details of the rupturable membrane area.

As best shown in FIGS. 2 and 5, each section 2 and 4 includes a uniform groove 8, 10, respectively, which extends substantially the length of rupturable membrane 6. The grooves 8 and 10 are disposed on the interior surface 12 of cover A on each of sections 2 and 4. Grooves 8 and 10 are of substantial width being much wider than rupturable membrane 6. As shown in FIG. 4, interior surface 12 of cover A faces the interior space 16 of a vehicle air bag compartment 18 and the exterior surface 14 thereof faces the interior of the vehicle. The compartment 18 is provided to house an air bag 20 therein in an undeployed state. (FIG. 4 shows the air bag 20 in the deployed state.) Grooves 8 and 10 include edges 22 and 24, respectively, which are disposed immediately adjacent the rupturable membrane 6 and are generally of a bead configuration. The beads 22 and 24 are provided so that sections 2 and 4 open along a predetermined path, thereby assuring proper exodus of air bag 20 upon its deployment. Grooves 8 and 10 cooperate with beads 22 and 24 in rupturing membrane 6. The grooves provide a more flexible area near membrane 6 thereby allowing maximum stress to be placed on the membrane when air bag 20 is inflated. Beads 22 and 24 act as a fulcrum placing additional stress on membrane 6 when air bag 20 is inflating. (Devices necessary for deploying air bag 20 have been eliminated for the sake of clarity.)

As shown in FIGS. 4, 6 and 7, sections 2 and 4 are provided with generally S-shaped flexible hinges 26 and 28, respectively, which allow the sections 2 and 4 to pivot outwardly from each other when the rupturable membrane 6 is ruptured, as shown in broken lines in FIG. 4. As best shown in FIG. 4, the thickness of the rupturable cover A is greater generally in the hinges 26 and 28 area and substantially lesser in the area of rupturable membrane 6.

As best shown in FIGS. 1 and 2, the rupturable cover A includes top and bottom flange portions 30 and 32, respectively, which remain hidden from view on the vehicle when rupturable cover A is mounted therein. The rupturable cover A is provided with a number of stake members 34 on the interior surface 12 on top and bottom flange portions 30 and 32. As shown in broken lines in FIG. 4, stake members 34 protrude through holes 36 in the compartment 18 of the vehicle, and are flattened (shown by solid lines in FIG. 4) by applying heat or the like to thereby permanently mount the rupturable cover A on vehicle dashboard B. Rupturable cover A may be mounted directly on an air bag module which can be assembled as a unit in the dashboard of the vehicle. Alternatively, rupturable cover A may be mounted on the dashboard B by screws 35 or the like, instead of stakes 34, shown in FIG. 8-10. In the embodiment where the rupturable cover A is mounted by screws or the like, the top and bottom flange portions 30 and 32 are provided with holes 38 through which screws 35 or the like may extend to be fastened with the compartment 18 of the vehicle.

As shown in FIGS. 1 and 2, top and bottom flange portions 30 and 32, include laterally extending tabs 40 and 41, respectively, which extend past the hinges 26 and 28 and facilitate mounting of rupturable cover A on the vehicle. The side portions 42 and 44 of sections 2 and 4 have generally inwardly curved top and bottom edges 46 and 48, respectively, and are further rounded in configuration. Therefore, when the rupturable cover A is mounted on the dashboard B, side portions 42 and 44 hide the corresponding portions (not shown) of compartment 18.

The hinges 26 and 28, each defines two oppositely oriented grooves 50 and 52, which are disposed on exterior and interior surfaces 12 and 14, respectively, in the area of top and bottom flange portions 30 and 32, shown in FIGS. 6 and 7. The grooves 50 and 52 generally extend the length of hinges 26 and 28 and accommodate corresponding portions of vehicle dashboard B in order to securely hold cover A thereon. As shown in FIGS. 6 and 7, grooves 50 and 52 disposed adjacent top portion 30 have substantially lesser depth (FIG. 6) than the grooves 50 and 52 disposed adjacent bottoms portion 32 (FIG. 7). The cover A further includes upper and lower furrows 51 and 53 disposed on the interior surface 12 thereof adjacent the area of top and bottom flange portion 30 and 32, respectively. Furrows 51 and 53, like grooves 50 and 52, also extend the length of hinges 26 and 28 and facilitate flush mounting of the cover A on dashboard B.

As shown in FIGS. 2 and 7, tabs 41 extending from bottom flange portion 32 include an inwardly inclined bottom surface 43 to further facilitate secure mounting of cover A on the dashboard B. Although bottom surface 45 of tabs 40 extending from upper flange portion 30, are shown to be generally flat, it is well within the scope of this invention to make it inclined as surfaces 43 of tabs 41.

The bottom flange portion 32 is further provided with recesses 54 (FIG. 1) on the exterior surface 14 along the length thereof, which to receive a lower portion C of vehicle dashboard B therein for securely mounting the cover A on dashboard B. The top flange portion 30 may also likewise be provided with recesses 54 or the like for receiving an upper portion D of the vehicle dashboard B.

The cover A, as best shown in FIGS. 4, 6, and 7 may preferably be made so as to have a certain depth E, except in the top and bottom portions 30 and 32. This depth E is provided to flush-mount the cover A with the entire dashboard B of the vehicle.

The rupturable cover of the present invention may preferably be made from a moldable thermoplastic polymeric material. One preferred material is Du Pont's "Hytrel" copolyether ester elastomer of the type disclosed in U.S. Pat. No. 3,651,014. (Hytrel is a registered trademark of E. I. du Pont de Nemours and Company, Wilmington, Del.). Additional examples of materials which may be used to make the present rupturable cover include polycarbonates, polyolefins, thermoplastic polyolefin alloys, polyurethanes, polyamides, polyacetals, thermoplastic polyester elastomers, polybutylene terephthalate, polyethylene terephthalate, acrylonitrile/butylene/styrene polymers and polystyrene.

During operation, when a specific set of predetermined conditions are reached, pressure builds up inside air bag 20 causing rupturable membrane 6 to rupture, thereby allowing sections 2 and 4 to pivot outwardly from each other about their respective hinges 26 and 28. Air bag 20 is then extruded from its compartment 18 and expands in the shape of a large balloon which prevents the passenger from leaning forwardly.

While this invention has been described as having a preferred design, it will be understood that it is capable of further modification. This application, is therefore intended to cover any variations, uses, or adaptations of the invention following the general principles thereof, and including such departures from the present disclosure as have come within known or customary practice in the art to which this invention pertains, and as may be applied to the essential features hereinbefore set forth and fall within the scope of this invention or the limits of the claims appended hereto.

What is claimed is:

1. A rupturable cover for a vehicle air bag compartment, comprising:
    (a) a unitary rupturable cover;
    (b) said rupturable cover including first and second sections;
    (c) said first and second sections being connected by a rupturable means;
    (d) means for securing said first and second sections to the vehicle for closing the air bag compartment and spaced from said rupturable means;
    (e) said securing means including flexible S-shaped hinge means for permitting said first and second sections to pivot outwardly from each other when said rupturable means is ruptured.

2. The rupturable cover of claim 1, wherein:
    (a) said rupturable means is disposed about a center line of said cover.

3. The rupturable cover of claim 1, wherein:
    (a) said rupturable means comprises a rupturable membrane.

4. The rupturable cover of claim 1 wherein:
    (a) said rupturable means is a rupturable membrane, said rupturable membrane having a head configuration immediately adjacent both sides of said membrane.

5. The rupturable cover of claim 1, wherein:

(a) said rupturable cover is made from a thermoplastic polymeric material.
6. The rupturable cover of claim 5, wherein:
(a) said material is a copolyether ester elastomer.
7. The rupturable cover of claim 1, wherein:
(a) the thickness of said rupturable cover is variable.
8. The rupturable cover of claim 7, wherein:
(a) said rupturable cover is thickest generally in said flexible S-shaped hinge means areas and thinnest generally in said rupturable means area.
9. The rupturable cover of claim 1, wherein:
(a) said securing means further includes tab means extending from the ends of said cover and past said flexible S-shaped, hinge means.

* * * * *

UNITED STATES PATENT AND TRADEMARK OFFICE
CERTIFICATE OF CORRECTION

PATENT NO. : 4,895,389
DATED : January 23, 1990
INVENTOR(S) : Wesley D. Pack, Jr.

It is certified that error appears in the above—identified patent and that said Letters Patent is hereby corrected as shown below:

In the Claims

Claim 4, Column 4, line 65, "head" should be --bead--

Signed and Sealed this

Seventh Day of May, 1991

Attest:

HARRY F. MANBECK, JR.

Attesting Officer

Commissioner of Patents and Trademarks